(12) United States Patent
Rixford

(10) Patent No.: US 10,147,141 B1
(45) Date of Patent: Dec. 4, 2018

(54) SYSTEMS AND METHODS FOR INTELLIGENT CONFIGURATION OF A DYNAMIC INTERFACE

(71) Applicant: Insurance Technologies Corporation, Carrollton, TX (US)

(72) Inventor: Laird Rixford, Irving, TX (US)

(73) Assignee: Insurance Technologies Corporation, Carrollton, TX (US)

( * ) Notice: Subject to any disclaimer, the term of this patent is extended or adjusted under 35 U.S.C. 154(b) by 705 days.

(21) Appl. No.: 14/746,553

(22) Filed: Jun. 22, 2015

(51) Int. Cl.
| | | |
|---|---|---|
| *G06Q 40/00* | (2012.01) | |
| *G06Q 40/08* | (2012.01) | |
| *G06Q 30/06* | (2012.01) | |
| *G06F 3/0482* | (2013.01) | |

(52) U.S. Cl.
CPC .......... *G06Q 40/08* (2013.01); *G06F 3/0482* (2013.01); *G06Q 30/0641* (2013.01)

(58) Field of Classification Search
CPC ..................................................... G06Q 40/08
USPC .............................................................. 705/4
See application file for complete search history.

(56) References Cited

U.S. PATENT DOCUMENTS

| | | |
|---|---|---|
| 6,469,745 B1 | 10/2002 | Yamada et al. |
| 7,333,939 B1 * | 2/2008 | Stender .................. G06Q 30/00 |
| | | 705/4 |
| 7,333,945 B1 | 2/2008 | Alling |
| 2001/0023414 A1 | 9/2001 | Kumar et al. |
| 2002/0010663 A1 | 1/2002 | Muller |
| 2002/0111835 A1 * | 8/2002 | Hele ...................... G06Q 10/10 |
| | | 705/4 |
| 2003/0177032 A1 * | 9/2003 | Bonissone ............ G06F 17/243 |
| | | 705/2 |
| 2004/0039548 A1 | 2/2004 | Selby et al. |
| 2004/0088195 A1 * | 5/2004 | Childress ............... G06Q 10/10 |
| | | 705/4 |
| 2004/0088196 A1 * | 5/2004 | Childress ............... G06Q 10/10 |
| | | 705/4 |
| 2004/0088197 A1 * | 5/2004 | Childress ............... G06Q 10/10 |
| | | 705/4 |
| 2004/0088198 A1 * | 5/2004 | Childress ............... G06Q 40/02 |
| | | 705/4 |

(Continued)

FOREIGN PATENT DOCUMENTS

WO    WO-2008016931 A2 *  2/2008  ............. G06Q 40/08

*Primary Examiner* — Samica L Norman
(74) *Attorney, Agent, or Firm* — Norton Rose Fulbright US LLP

(57) ABSTRACT

A method includes receiving a request for a user interface configuration schema, and, in response to receiving the request, providing the user interface configuration schema to the electronic device. The request may be received from or at an electronic device. The user interface configuration schema may include information for configuring one or more input fields of a user interface provided by the electronic device. Subsequent to providing the user interface configuration schema, the method includes receiving information from the electronic device. The information may correspond to data entered into the one or more input fields of the user interface. The method includes determining whether the received information is valid, and, in response to a determination that the received information is valid, providing rate information associated with an insurance product offering to the electronic device.

20 Claims, 2 Drawing Sheets

(56) References Cited

U.S. PATENT DOCUMENTS

| | | |
|---|---|---|
| 2004/0088199 A1* | 5/2004 | Childress .............. G06Q 40/02 705/4 |
| 2004/0117252 A1 | 6/2004 | Knischewski |
| 2004/0128147 A1* | 7/2004 | Vallinayagam .... G06Q 30/0283 |
| 2004/0172310 A1* | 9/2004 | Atlee .................... G06F 17/243 705/4 |
| 2005/0010575 A1* | 1/2005 | Pennington ............ G06Q 10/10 |
| 2006/0031154 A1 | 2/2006 | Noviello et al. |
| 2006/0064313 A1 | 3/2006 | Steinbarth et al. |
| 2006/0100912 A1* | 5/2006 | Kumar .............. G06F 17/30864 705/4 |
| 2006/0212376 A1 | 9/2006 | Snyder et al. |
| 2007/0067735 A1* | 3/2007 | Hawley ................ G06Q 10/087 715/792 |
| 2007/0100722 A1 | 5/2007 | Ferguson et al. |
| 2007/0156592 A1 | 7/2007 | Henderson |
| 2007/0185743 A1* | 8/2007 | Jinks ..................... G06Q 40/08 705/4 |
| 2007/0250769 A1* | 10/2007 | Bass ..................... G06F 17/243 715/234 |
| 2007/0250783 A1* | 10/2007 | Wu ....................... G06F 17/243 715/762 |
| 2007/0260559 A1 | 11/2007 | Ginsberg |
| 2008/0052101 A1* | 2/2008 | Ziade .................... G06Q 40/08 705/4 |
| 2008/0052135 A1* | 2/2008 | Ziade .................... G06Q 40/00 705/4 |
| 2008/0052136 A1* | 2/2008 | Ziade .................... G06Q 40/00 705/4 |
| 2008/0052137 A1* | 2/2008 | Ziade .................... G06Q 40/00 705/4 |
| 2008/0065426 A1* | 3/2008 | Ziade .................... G06Q 40/08 705/4 |
| 2008/0120253 A1 | 5/2008 | Abdulali |
| 2008/0221936 A1* | 9/2008 | Patterson .............. G06Q 10/10 705/4 |
| 2009/0089690 A1 | 4/2009 | Chi et al. |
| 2009/0313563 A1 | 12/2009 | Faivre et al. |
| 2010/0114995 A1* | 5/2010 | Kopp ................. G06F 17/2247 707/811 |
| 2010/0153137 A1* | 6/2010 | Rao ........................ G06Q 40/08 705/4 |
| 2010/0324944 A1 | 12/2010 | Rao |
| 2011/0119574 A1* | 5/2011 | Rogers ................. G06F 17/227 715/239 |
| 2011/0125838 A1 | 5/2011 | Rao |
| 2011/0166880 A1 | 7/2011 | Keynan et al. |
| 2011/0213811 A1* | 9/2011 | Ziade .................... G06Q 40/00 707/805 |
| 2011/0238452 A1* | 9/2011 | Ziade .................... G06Q 40/00 705/4 |
| 2012/0022898 A1 | 1/2012 | Koa |
| 2012/0143631 A1* | 6/2012 | Ziade .................... G06Q 40/08 705/4 |
| 2013/0085967 A1 | 4/2013 | Robb |
| 2014/0025435 A1 | 1/2014 | Bansal et al. |
| 2014/0149273 A1 | 5/2014 | Angell et al. |
| 2014/0317595 A1* | 10/2014 | Kilby ................. G06Q 10/06316 717/105 |
| 2014/0350972 A1* | 11/2014 | Haywood .............. G06Q 40/08 705/4 |
| 2015/0199699 A1 | 7/2015 | Milton et al. |
| 2016/0343080 A1 | 11/2016 | Weng et al. |
| 2017/0103229 A1 | 4/2017 | Gellas |

* cited by examiner

SYSTEMS AND METHODS FOR INTELLIGENT CONFIGURATION OF A DYNAMIC INTERFACE

TECHNICAL FIELD

The present application is generally related to interface configuration, and more particularly to intelligent configuring a dynamic interface in connection with obtaining information from a consumer in connection with one or more insurance product offerings.

BACKGROUND

Presently, quotes for insurance rates may be obtained from insurance companies directly, or from third parties that may offer insurance product offerings on behalf of one or more insurance companies. The rate quotes may be requested by consumers desiring to purchase a new insurance product offering, or to make changes to existing insurance product offerings. Typically, the rate quotes are provided by the insurance companies, agencies, or the third parties by telephone, in-person, via a desktop-based application interface, or via a web-based application interface. Providing the rate quotes via an interface is problematic for entities operating such systems. For example, typically, such interfaces are hard coded, meaning that changes to the required information or input fields of the interface require recoding of at least a portion of the interface affected by the changes. Thus, when the required information needed for providing a rate quote for an insurance product offering changes, the interface also need to be reprogrammed, increasing the administrative burden of maintaining the interface in an up-to-date state. Additionally, when a third party maintains the interface and is providing quotes on behalf of multiple insurance companies, each of the insurance companies may have different information requirements for the same insurance product offering, which may increase the frequency at which the interfaces need to be reprogrammed. Additionally, when reprogramming the interfaces in response to change by one of the insurance companies, the third party must be careful to not make changes to the programming of the interface that would cause the information collected for the remaining insurance companies to be incomplete or incorrect.

SUMMARY

The present disclosure describes systems, methods, apparatuses, and computer-readable storage media for providing a user interface configuration schema for configuring user interfaces used to provide rate quotes for insurance product offerings. The user interface configuration schema may include information for dynamically constructing interfaces that include one or more input fields for capturing information required for providing the rate quotes for the insurance product offerings.

In an embodiment, a method for configuring a user interface in accordance with a user interface configuration schema is disclosed. The method includes receiving a request for a user interface configuration schema, and, in response to receiving the request, providing the user interface configuration schema. The user interface configuration schema may include information for configuring one or more input fields of a user interface provided by the electronic device. Subsequent to providing the user interface configuration schema, the method includes receiving information corresponding to data entered into the one or more input fields of the user interface. The method includes determining whether the received information is valid, and, in response to a determination that the received information is valid, providing rate information associated with an insurance product offering.

In another embodiment, computer-readable storage medium storing instructions that, when executed by a processor, cause the processor to perform operations for configuring a user interface in accordance with a user interface configuration schema is disclosed. The operations may include receiving a request for a user interface configuration schema, and, in response to receiving the request, providing the user interface configuration schema. The user interface configuration schema may include information for configuring one or more input fields of a user interface provided by the electronic device. Subsequent to providing the user interface configuration schema, the operations include receiving information corresponding to data entered into the one or more input fields of the user interface. The operations include determining whether the received information is valid, and, in response to a determination that the received information is valid, providing rate information associated with an insurance product offering.

In an embodiment, an apparatus for configuring a user interface in accordance with a user interface configuration schema is disclosed. The apparatus may include one or more processors, and a memory coupled to the one or more processors. The one or more processors may be configured to receive a request for a user interface configuration schema, and, in response to receiving the request, providing the user interface configuration schema. The user interface configuration schema may include information for configuring one or more input fields of a user interface. The one or more processors may be configured to receive, subsequent to providing the user interface configuration schema, information corresponding to data entered into the one or more input fields of the user interface, and to determine whether the received information is valid. In response to a determination that the received information is valid, the one or more processors may be configured to provide rate information associated with an insurance product offering.

The foregoing has outlined rather broadly the features and technical advantages of the embodiments of present disclosure in order that the detailed description that follows may be better understood. Additional features and advantages of the embodiments will be described hereinafter which form the subject of the claims of the present disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are believed to be characteristic of the embodiments, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

DETAILED DESCRIPTION

Figure 1:
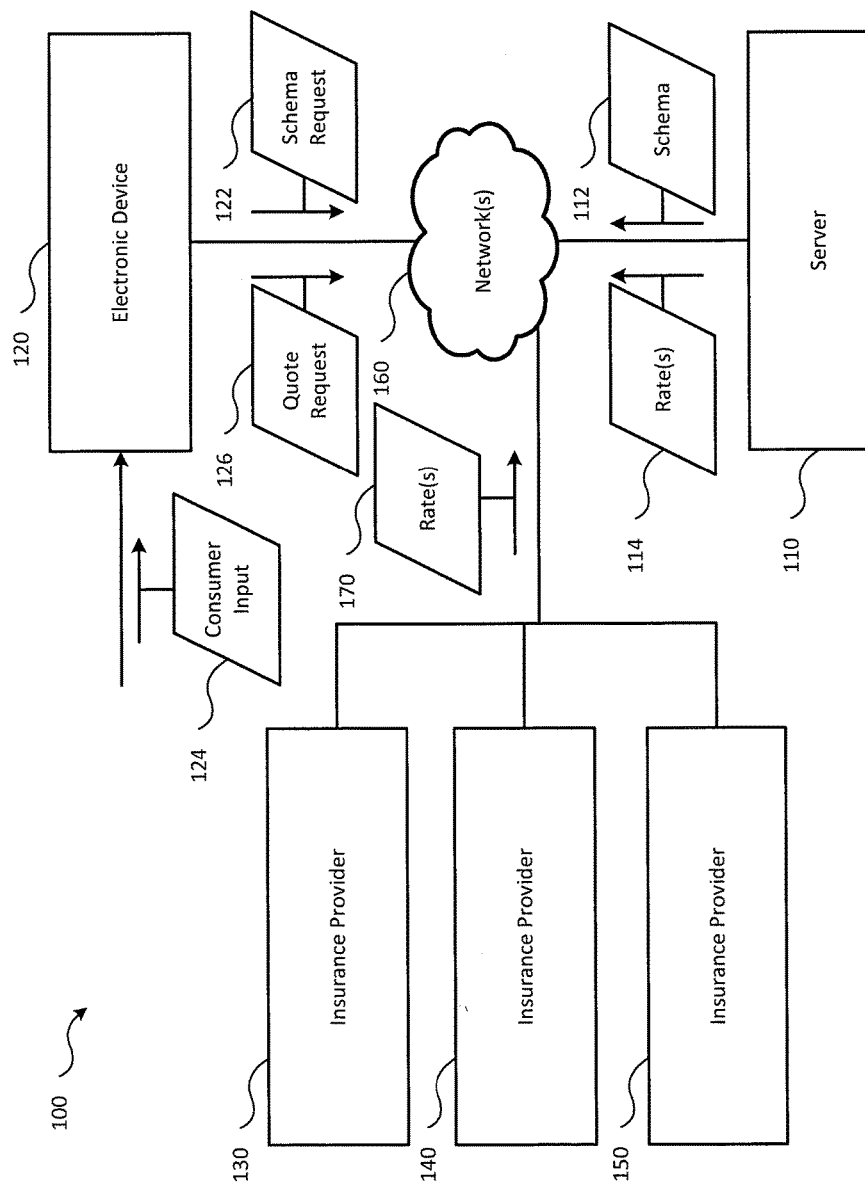
FIG. 1 is a block diagram of a system for providing a dynamically updatable user interface using user interface configuration schema.

Referring to FIG. 1, a block diagram of a system for providing a dynamically updatable user interface using user interface configuration schema is shown as a system 100. As shown in FIG. 1, the system 100 includes a server 110, an electronic device 120, and a plurality of insurance provider devices 130, 140, 150. In an embodiment, the server 110 may be operated by an insurance provider. In an additional or alternative embodiment, the server 110 may be operated by a third party that provides rate quotes for insurance product offerings on behalf of a plurality of insurance providers (e.g., operators of the plurality of insurance provider devices 130, 140, 150. The server 110 may include one or more processors and a memory (not shown in FIG. 1). The memory may store instructions that, when executed by the one or more processors, cause the one or more processors to perform the operations described in connection with the server 110 with reference to FIGS. 1-2. In an embodiment, the memory of the server 110 may store a database of information that may be used to support the operations of the server 110, as described in more detail below.

In an embodiment, the memory may include random access memory (RAM), read only memory (ROM), flash memory, electronically programmable ROM (EPROM), electronically erasable programmable ROM (EEPROM), magneto-resistive RAM (MRAM), one or more hard disk drives, one or more solid state drives, compact disks, digital video disks, other computer-readable storage media, other types of memory configured to store information in a persistent or non-persistent state, or a combination thereof. Additionally, the memory may store one or more databases (e.g., storing user interface configuration schema information, quote requests, quote request validation results, or other information). Further, the server 110 may be communicatively coupled to one or more external memory devices, such as a network attached storage device (not shown in FIG. 1), one or more external data storage devices or systems (e.g., a database server or system), or a combination thereof.

In an embodiment, the electronic device 120 may be a personal computing device, a laptop computing device, a tablet computing device, a smartphone, a personal digital assistant, or another electronic device configured to perform the operations of the electronic device 120 in accordance with the embodiments of the system 100 disclosed herein. In an embodiment, the electronic device 120 may include one or more processors and a memory (not shown in FIG. 1). The memory may store instructions that, when executed by the one or more processors, cause the one or more processors to perform the operations described in connection with the electronic device 120 with reference to FIGS. 1-2.

In an embodiment, the memory may include random access memory (RAM), read only memory (ROM), flash memory, electronically programmable ROM (EPROM), electronically erasable programmable ROM (EEPROM), magneto-resistive RAM (MRAM), one or more hard disk drives, one or more solid state drives, compact disks, digital video disks, other computer-readable storage media, other types of memory configured to store information in a persistent or non-persistent state, or a combination thereof. Additionally, the memory may store one or more databases (e.g., storing user interface configuration schema information, quote requests, quote request validation results, or other information). Further, the electronic device 120 may be communicatively coupled to one or more external memory devices, such as a network attached storage device (not shown in FIG. 1), one or more external data storage devices or systems (e.g., a database server or system), or a combination thereof.

As shown in FIG. 1, the server 110, the electronic device 120, and the plurality of insurance provider devices 130, 140, 150 may be communicatively coupled via a network 160 to facilitate exchanges of information between the respective devices, as described in more detail below. In an embodiment, the network 160 may include one or more networks. For example, the network 160 may include wired networks, wireless networks, local area networks (LANs), wireless LANs (WLANs), wide area networks (WANs), metropolitan area networks (MANs), cellular networks, public networks (e.g., the Internet), private networks, other network types and topologies, or a combination thereof.

The server 110 may be configured to generate and provide schemas for configuring a user interface to be presented via the electronic device 120. For example, in an embodiment, the server 110 may be a web server configured to serve a web page or web pages to the electronic device 120. The web page(s) may be provide a user interface that may be used to capture information associated with a consumer in connection with a request to purchase or modify an insurance product offering. The user interface, when configured according to the schema, may be used to capture information for generating a rate quote for an insurance product offering offered by one or more of the plurality of insurance providers associated with the plurality of insurance provider devices 130, 140, 150.

During operation, the electronic device 120 may receive consumer input 124. Initially, the consumer input 124 may be a request to navigate a web browser application executing on the electronic device 120 to a web page (e.g., a web page provided by the server 110) configured to capture information associated with the consumer in connection with providing a rate quote for an insurance product offering provided by one or more of the plurality of insurance providers. In an embodiment, the web page may initially present one or more input fields to a user of the electronic device 120, where the one or more input fields may be used by the user to identify insurance product offerings of interest (e.g., insurance product offerings that the consumer is interested in purchasing). The user may provide additional consumer input 124 to indicate the insurance product offerings of interest to the input fields. This input may then cause the web page to request a schema from the server 110. For example, the user may provide an input indicating that the consumer is interested in obtaining a rate quote for an automobile insurance product offering, and then select a "submit" button. Selection of the submit button may cause the web page to initiate transmission of a request from the electronic device 120 to the server 110. For example, in an embodiment, the request may indicate that the web page is requesting a user interface configuration schema for configuring the web page to capture information that may be used to generate one or more rate quotes for automobile insurance for the consumer. In other embodiments, the request may indicate that the web page is requesting a user interface configuration schema for configuring the web page to capture information that may be used to generate one or more rate quotes for other types of insurance product offerings (e.g., life insurance, health insurance, disability insurance, flood insurance, home insurance, etc.) for the consumer.

The electronic device 120 may transmit a schema request 122 to the server 110, and, in response to receiving the schema request 122, the server 110 may provide a user interface configuration schema 112 to the electronic device 120. In an embodiment, in response to receiving the schema request 122, the server 110 may identify a particular user interface configuration schema to transmit to the electronic device 120. For example, the database may store a plurality of user interface configuration schemas for configuring the user interface for different insurance product offerings. In an embodiment, the user interface configuration schema may provide an interface that is customized for a particular template, company, user, line of business, configured company questions, location, state, or a combination thereof.

In an embodiment, each of the user interface configuration schemas stored at the database may identify a plurality of information objects. In an embodiment, the plurality of information objects may include a set of required information objects and a set of optional information objects. The set of required information objects may identify one or more information input fields configured to capture information that is required by the insurance providers for providing the rate information associated with the insurance product offering(s) of interest to the consumer. In an embodiment, the set of required information objects may include a threshold number of input fields, where the threshold number of input fields are configured to capture a minimum amount of information required by the insurance providers to provide a rate quote. The set of optional information objects may identify one or more information fields configured to capture additional information that is not necessary to provide a rate quote. Information captured via inputs to input fields corresponding to the set of optional information objects may be used to increase the accuracy of rate information provided by the insurance providers. For example, the set of required information objects may be used by the insurance providers to generate a rate quote which may be higher or lower than would otherwise have been provided by the insurance providers had the consumer provided inputs to at least some of the input fields corresponding to the set of optional information object.

In an embodiment, user interface configuration schemas associated with different insurance product offerings may have different sets of required information objects and optional information objects. For example, a user interface configuration schema for configuring the user interface to capture information associated with generating a rate quote for an automobile insurance product offering may have a different set of required and optional information objects than a user interface configuration schema for configuring the user interface to capture information associated with a rate quote for a home insurance product offering. In an embodiment, the different sets of required information objects and optional information objects for the different insurance product offerings may have at least one common information field for each of the set of required information objects and the set of optional information objects. For example, both sets of required information objects may require information regarding the consumer's name, and both sets of optional information objects may include input fields for providing information relating to the consumer's employment, salary, and the like. Additional aspects and features that may be provided by the system 100 in connection with using sets required and optional information objects are described in more detail below.

In an embodiment, the user interface configuration schema may identify a web service associated with at least one of the one or more input fields to be configured in accordance with the schema. The web service may be used to provide information to the electronic device 120 for populating the user interface according to the user interface configuration schema. For example, the one or more input fields may include at least one drop down menu, and the web service identified in the user interface configuration schema may provide information for populating selectable elements of the drop down menu (e.g., populating a list of car makes/models/years in connection with a request for a rate quote for an automobile insurance product offering).

In an embodiment, the one or more input fields defined by the user interface configuration schema may include at one cascading input field. The at least one cascading input field, when configured according to the user interface configuration schema, may provide a series of input fields. In an embodiment, the quantity and type of input fields presented in the series of input fields associated with the cascading input field may be dependent upon inputs provided by the user. For example, a cascading input field may initially include a single input field prompting the user to indicate whether the consumer is married. If the user provides an input indicating that the consumer is married, additional input fields may be presented so that the user may provide information regarding the consumer's spouse. If the user provides an input indicating that the consumer is not married, the additional input fields may not be presented so that the user may provide information regarding the consumer's spouse.

In an embodiment, a cascading input field may be associated with a web service identified in the user interface configuration schema, and information presented in the series of input fields is dynamically updated using the web service. For example, an initial input field may ask the user to provide information regarding the make of the vehicle that the consumer desires to cover in connection with an automobile insurance product offering. The input field may be a dropdown menu, and the web service may be used to populate the dropdown menu with a list of vehicle manufacturers. In response to a selection of a manufacturer listed in the dropdown menu, a second dropdown menu may be presented and populated (e.g., using the web service) with various models of vehicles manufactured by the manufacturer selected by the user. After selecting the model of the vehicle, a third dropdown menu may be presented and populated (e.g., using the web service) with various years that the selected model of vehicle was manufactured by the manufacturer. In an embodiment, the user interface configuration schema may include rule information that dictates the presentation order of the cascading input field (i.e., what input field(s) is initially presented to the user, what input values cause additional input fields to be presented or hidden, any web services associated with the cascading input field(s), and the like).

As shown in FIG. 1, in response to receiving the schema request 122, the server 110 may identify a user interface configuration schema 112, and may transmit the user interface configuration schema 112 to the electronic device 120.

The user interface configuration schema 112 may be used by the electronic device 120 (or the web browser) to configure a user interface for capturing information that is to be used to generate a rate quote for the insurance product offering. It is noted that, although described in connection with a web page presented via a web browser executing on the electronic device 120, in some embodiments, the techniques of embodiments for providing and using the user interface configuration schema may also be performed by an application (e.g., a mobile device-based application, a desktop-based application, etc.) resident on the electronic device 120, and use of a web-based technique is not required. In such embodiments, the application may periodically communicate with the server 110 to receive software updates and to provide feedback to the server 110, as described in more detail below.

The user interface configuration schema 112 may include information for configuring the user interface such that it may capture information necessary to provide rate quotes for the insurance product offerings the consumer is interested in. The user interface may include one or more input fields that the user may use to input the information needed to obtain the rate quote(s). In an embodiment, the user interface configuration schema 112 may include information that identifies, for each of the one or more input fields, an input field name, an input field type, an input field mask (e.g., how to format the information input into a particular input field), a default input field value (e.g., text box, radio button, check box, drop down menu, etc.), an input field requirement indicator (e.g., is the input field a required input field or an optional input field), mapping information (e.g., information that identifies dependencies and relationships between different input fields and/or the threshold information required to provide the rate quote(s)), an input field limit (e.g., how many characters may be input into a text box, etc.), input field placeholder information (e.g., temporary text displayed in a text box that describes the type of information the user should input), globalization information (e.g., information that enables the user interface to be presented in multiple languages, color schemes, such as for visually impaired persons, etc.), insurance product provider information selection information (e.g., information that enables the user to select insurance providers from which rate quotes may be obtained for a particular insurance product offering), other input field attributes and rules, or a combination thereof. In an embodiment, this information may be used to configure each of the input fields to capture the information from the user, to format information received from the user such that the information is compatible with other systems (e.g., one or more of the plurality of insurance provider device 130, 140, 150), or for other reasons, such as to format the information for storage at the database of the server 110. Upon receiving the user interface configuration schema 112, the electronic device 120 (or the web browser or application) may populate the user interface with the one or more input fields according to the information included in the user interface configuration schema 112.

After generating the user interface in accordance with the configuration specified by the user interface configuration schema 112, the user (e.g., a consumer, an insurance agent, an employee of an insurance carrier, etc.), may provide information (e.g., additional consumer input 124) to the one or more input fields, and submit the information as a quote request 126. In an embodiment, the electronic device 120 may transmit the quote request 126 to the server 110 via the network 160. The server 110 may receive the quote request 126, and, in response to receiving the quote request 126, may validate the information included in the quote request 126 to determine whether sufficient information for generating the rate quote has been provided by the user. In an embodiment, validation may include verifying that all required information for the selected insurance product offering(s) has been provided by the user (e.g., whether the user has provided inputs to the input fields corresponding to the set of required information objects). If the quote request 126 is valid, the server 110 may initiate creation of one or more rate quotes. In an embodiment, initiating creation of one or more rate quotes may include generating the rate quotes at the server 110. In an additional or alternative embodiment, initiating creation of one or more rate quotes may include transmitting information to one or more of the plurality of insurance provider devices 130, 140, 150, which then generate the rate quote(s) 170 based on information received from the server 110.

The rate quote(s) may be provided to the user via the user interface or another technique (e.g., e-mail, text message, a different web page, etc.). For example, if the server 110 generates the rate quote, the server 110 may provide a rate quote(s) 114 to the electronic device 120. As another example, in an embodiment, the server 110 may receive rate quotes 170 from the one or more insurance provider devices 130, 140, 150, and then forward the rate quotes 170 to the electronic device 120 for display via the user interface. As yet another example, in an embodiment, one or more of the insurance provider devices 130, 140, 150 may provide the rate quotes 170 directly to the electronic device 120. In an embodiment, the one or more insurance provider devices 130, 140, 150 may provide the rate quotes 170 to the server 110 in addition to providing the rate quotes 170 directly to the electronic device 120. The server 110 may then use the rate quotes 170 to determine whether to modify the user interface configuration schema 112, as described in more detail below.

If the request for the quote is invalid (e.g., inputs have not been provided for each of the required information objects), information indicating the reasons(s) that the information was found invalid may be provided to the electronic device 120. For example, the information may indicate that the user failed to provide an input for a required input field (e.g., information object). As explained above, the required input fields may correspond to a minimum amount of information required to obtain a rate quote. The user interface may then be updated to indicate the additional input fields that the user must provide inputs for in order to obtain a rate quote. Once the additional inputs are received, the rate quotes may be generated as described above.

In an embodiment, the user interface configuration schema 112 may be dynamically updated in response to real-time changes to requirements for information necessary to provide the rate quotes. For example, changes to the user interface configuration schema 112 during an active quote session may be rendered invalid if they do not satisfy the updated user interface configuration schema 112 (e.g., the updated information requirements). For example, the user interface configuration schema 112 may be provided to the electronic device 120 at a first time, and the electronic device 120 may configure the interface in accordance with the user interface configuration schema 112, as described above. While the user is interacting with the user interface to provide inputs to the one or more input fields, the user interface configuration schema 112 may be updated, and the changes may alter the set of required information objects and/or the set of optional information objects. When the user (or the electronic device 120) submits the quote request 126 to the server 110, the quote request 126 may be validated using the updated user interface configuration schema 112. If the required information for providing a rate quote under the updated user interface configuration schema 112 is present, the quote request 126 may be determined valid, and the user will receive the rate quote(s) 114 or 170, as described above.

However, if the required information for providing the rate quotes under the updated user interface configuration schema 112 is not satisfied (i.e., the quote request 126 is determined invalid), a response associated with the validation of the information may be provided to the electronic device 120. In an embodiment, the response may include a partial user interface configuration schema (e.g., a user interface configuration schema that identifies only the input fields that caused the quote request 126 to be invalid). In an additional or alternative embodiment, the response may include a full user interface configuration schema (e.g., a user interface configuration schema that includes information for configuring all input fields of the interface). In an embodiment, the response may also include information indicating the particular fields that caused the quote request 126 to be determined invalid. In an embodiment, the user interface configuration schema may include information for pre-populating one or more input fields associated with valid inputs, while omitting information included in the quote request 126 that is associated with invalid inputs. For example, when the response includes the full user interface configuration schema, the user interface may then be reconfigured or updated to be prepopulated with all valid inputs, and the user may be prompted to provide the additional required information (e.g., the information associated with invalid inputs). This may reduce an amount of time to re-enter the inputs and submit a new quote request including all valid inputs. By validating the quote request 126 using the most up-to-date version of the user interface configuration schema 112, rate quotes provided by the system 100 may be more accurate. Additionally, this allows for real-time changes to be made to the user interface configuration schema 112 and other user interface configuration schemas stored at the database in response to changes to information required by the insurance companies. Further, because the user interface presented via the web page is dynamically generated using the user interface configuration schema 112, the web pages do not need to be reprogrammed after each change to the schema, thus reducing the costs to operate the system 100.

In an embodiment, the system 100 may be configured to dynamically modify the user interface configuration schema 112. For example, the database stored at the server 110 (or at a location accessible to the server 110) may store information that may be used to track factors that affect the rate quotes provided in response to quote requests. For example, as explained above, the set of required information elements may correspond to a minimum number of information elements for which information must be provided by the user to receive a rate quote, and the set of optional information objects may correspond to information elements for which information may be provided by the user to increase the accuracy of the received rate quotes. The system 100, and more particularly the server 110, may monitor rate quotes to identify factors that have the greatest effect on the quoted rates. For example, the server 110 may observe that quoted rate increase or decrease by an amount (e.g., "X" percent) when information is provided in connection with one or more of the input fields corresponding to the set of optional information objects relative to when only the required information is provided. In such cases, the server 110 may modify the user interface configuration schema 112 to increase a likelihood that the user provides inputs to those one or more optional input fields. For example, the server 110 may modify the user interface configuration schema 112 so that the optional input fields are placed immediately following the required information fields, and other optional input fields may be placed below those optional input fields. Thus, the user may be more likely to provide inputs to at least some of the first optional input fields, although the user may not provide inputs to all of the optional input fields. By moving the optional input fields that have the greatest impact on the quoted rates to a location that is more likely to receive user inputs, the user will be more likely to provide at least some of the optional information and receive more accurate rate quotes.

In an embodiment, modifying the user interface configuration schema 112 may include adding input fields and/or removing input fields. For example, the server 110 may determine that particular optional input fields have little to no impact on quoted rates. Because this information is not required and has no impact on the quoted rates, the server 110 may remove these input fields, which may simplify the user interface and make it more easily completed, reduce clutter, and otherwise improve the overall performance of the user interface and the quoted rates (e.g., because only optional information that impacts the quoted rate may be presented at the user interface).

In an embodiment, user interfaces configuration schemas for different insurance product offerings may be analyzed to identify whether input fields present in one user interface schema have, but not another, have an impact on quoted rates. If it is determined that the input fields have an impact, the server 110 may add that field to the other user interface schema and then monitor whether that information has an impact on the quoted rates. For example, optional information provided in connection with a user interface configured for capturing information associated with an automobile insurance product offering may be determined to have an impact on quoted rates. That optional information may not be included in optional input fields of a user interface configured according to another user interface configuration schema for capturing information associated with a home insurance product offering. However, the server 110 may modify the user interface configuration schema for capturing information associated with the home insurance product offering to include these impactful optional input fields that were not previously present, and then monitor whether those optional input fields that were added also impact quoted rates for the home insurance product offering.

In an additional or alternative embodiment, the server 110 may modify the user interface configuration schema 112 to provide an indication of the impact that providing information for particular optional input fields will have on the quoted rates. Thus, the user interface configuration schema 112 may be periodically modified to reflect an average percentage change in the rate quote for one or more of the input fields. For example, the user interface configuration schema 112 may be modified such that information is presented proximate to a particular field to indicate that, if information is provided for the particular input field, the quoted rates will be "X" percent more accurate. In an embodiment, the user interface configuration schema 112 may be updated to indicate whether the change in the quoted rates is likely to increase or decrease the quoted rates. Such information may also be reflected in the user interface when configured according to the user interface configuration schema 112.

By monitoring rate quotes and which fields (e.g., which optional information objects/input fields) user are providing inputs for, the server 110 and the system 100 may track trends in quoted rates, and make recommendations to consumers that will improve the accuracy of the quoted rates. Thus, the system 100 improves the technical field of providing insurance rate quotes by dynamically providing consumers with feedback to improve the accuracy of rate quotes. This may reduce network traffic because additional requests for quotes may not be needed to obtain more accurate rate quotes, may decrease an amount of time required to obtain an accurate rate quote, and improve the operations of the electronic device 120, the server 110, and the insurance provider devices 130, 140, 150 (e.g., by reducing the number of communications exchanged between the respective devices in order to obtain accurate quotes).

Additionally, as explained above, by configuring the user interface using the user interface configuration schema 112, the cost to administer web pages and other media (e.g., stand-alone application) used to present user interfaces configured for capturing information and providing rate quotes may be reduced (i.e., because the web pages and other media do not need to be reprogrammed after information requirements change). This may also improve the performance and operation of the server 110 and the electronic device 120 by increasing the availability of the web page(s) and other media for obtaining rate quotes.

It is noted that, although FIG. 1 has been primarily described as providing the user interface via a web page presented at the electronic device 120, embodiments of the present disclosure may also present the user interface via other techniques. For example, an application may be installed on the electronic device 120, and, when executed at the electronic device, the application may perform operations to configure a user interface in accordance with a user configuration schema as described above. In an embodiment, the application may periodically communicate with the server 110 to communicate information associated with quote requests generated using the application and information associated with received rate quotes, which may then be used by the server 110 to modify the user interface configuration schema(s) stored at the database.

Additionally, the application may periodically retrieve one or more user interface configuration schemas from the database, which may then be stored at the memory of the electronic device 120 (or a memory communicatively coupled to the electronic device 120). By storing the user interface configuration schemas at the electronic device 120, the application may be configured to generate quote requests, and to validate the quote requests without requiring communication with the server 110, thus reducing network traffic and transforming the electronic device 120 into a rate quote server. In an embodiment, during validation of a quote request, the application may verify that a user configuration schema that was used to configure a user interface used to generate the quote request is up-to-date prior to determining that the quote request is valid. This may be accomplished by verifying a version number of the user interface configuration schema is a current version of the user interface configuration schema. If the user interface configuration schema, a message confirming the user interface configuration schema is current may be sent without requiring the user interface configuration schema or other information to be sent, thus minimizing the impact on the network 160. If the user interface configuration schema is not current, the server 110 may transmit the current version of the user interface configuration schema to the electronic device 120, and the application may perform validation of the quote request using the current version of the user interface configuration schema.

Further, it is noted that in embodiments where the user interface is presented to the user via a web page presented within a web browser of the electronic device 120, user interface configuration schemas may be cached by the web browser such that the web browser and web page may perform one or more of the operations performed by the server 110, such as quote request validation, transmitting the quote requests to the insurance provider devices 130, 140, 150, etc. In an embodiment, the web page and/or web browser may communicate with the server 110 during validation to verify that a user interface configuration schema used for validation is current (e.g., as described in connection with performing validation of a quote requests using the application).

Figure 2:
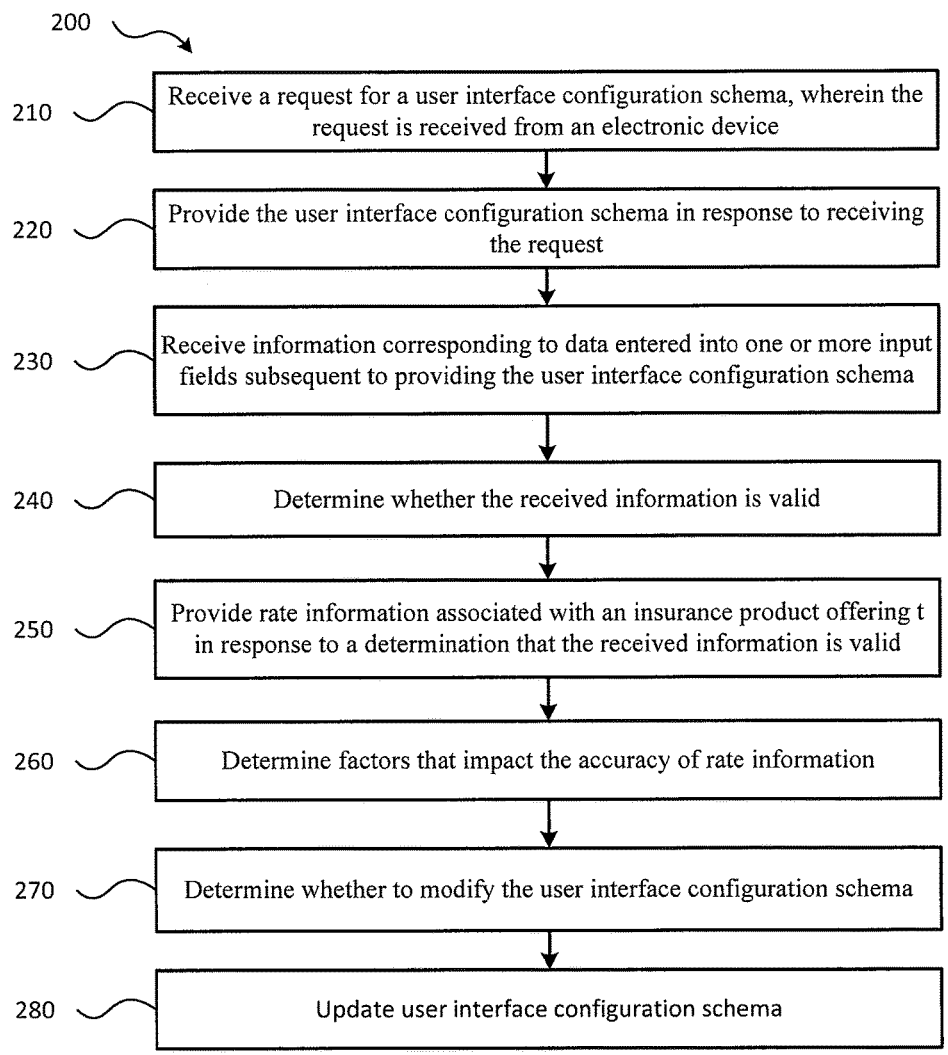
FIG. 2 is a flow diagram of an embodiment of a method for configuring a user interface according to a user interface configuration schema.

Referring to FIG. 2, a flow diagram of an embodiment of a method for configuring a user interface according to a user interface configuration schema is shown as a method 200. In an embodiment, the method 200 may be performed by the server 110 of FIG. 1. In an additional or alternative embodiment, the method 200 may be performed by an application executing on the electronic device 120 of FIG. 1. In yet another additional or alternative embodiment, the method 200 may be performed by a web browser and web page presented at the electronic device 120 of FIG. 1. In an embodiment, the method 200 may be stored as instructions stored at a memory (e.g., a memory of the server 110 or the electronic device 120 of FIG. 1), and the instructions, when executed by a processor (e.g., a processor of the server 110 or the electronic device 120 of FIG. 1), cause the processor to perform operations in accordance with the method 200.

At 210, the method 200 includes receiving a request for a user interface configuration schema. At 220, the method 200 includes providing the user interface configuration schema in response to receiving the request. In an embodiment, the requests may be received at a server (e.g., the server 110 of FIG. 1) from an electronic device (e.g., the electronic device 120 of FIG. 1), and the user configuration interface schema may be provided from the server to the electronic device. In an additional or alternative embodiment, the request may be received by an application or web browser/web page executing on the electronic device, and the user interface configuration schema may be provided from a memory of the electronic device. The user interface configuration schema may include information for configuring one or more input fields of a user interface provided at the electronic device.

At 230, the method 200 includes receiving information (e.g., a quote request) corresponding to data entered into the one or more input fields of the user interface that has been configured in accordance with the user interface configuration schema, and, at 240, determining whether the received information is valid. In an embodiment, the determination of whether the received information is valid may include determining whether input fields corresponding to a set of required information object (or input fields) has been provided. In an additional or alternative embodiment, the validation may include verifying that a version of the user interface configuration schema used to configure the user interface is a current version, as described with reference to FIG. 1.

At 250, the method 200 includes providing rate information (e.g., rate quotes) associated with an insurance product offering in response to a determination that the information is valid. In an embodiment, the rate information may be provided by the server. In an additional or alternative embodiment, the rate information may be provided by one or more insurance provider devices. In an embodiment, the rate information may be obtained using a web service specified in the user interface configuration schema.

At 260, the method 200 includes determining factors that impact the accuracy of the rate information. In an embodiment, determining factors that impact the accuracy of the rate information may include analyzing rate information (e.g., rate quotes) to identify optional information that has an impact on the quoted rate for an insurance product offering, as described above with reference to FIG. 1. At 270, the method 200 includes determining whether to modify the user interface configuration schema. In an embodiment, modifying the user interface configuration schema may change a location of one or more input fields within the user interface, may add input fields to the user interface, remove input fields from the user interface, present information proximate one or more input fields of the user interface (e.g., percentage rate quote change information), or other changes that alter the configuration of the user interface when configured according to the user interface configuration schema relative to a previous version. At 280, the method 200 includes updating the user interface configuration schema. In an embodiment, the user interface configuration schema may only be modified if it is determined, at 260, that a factor has a threshold impact (e.g., a threshold percentage change) on the quoted rate.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
periodically analyzing rate information and rate request information associated with a first insurance product offering to identify one or more impactful input fields associated with a first user interface configuration schema of a plurality of user interface configuration schemata, wherein the first user interface configuration schema corresponds to the first insurance product offering, wherein each of the plurality of user interface configuration schemata identifies a plurality of information objects corresponding to a plurality of input fields configured to receive rate request information, wherein the rate request information associated with the first insurance product offering comprises information received via a plurality of input fields of a first user interface configured using the first user interface configuration schema, wherein the rate information associated with the first insurance product offering is generated based on the rate request information, and wherein the one or more impactful input fields are a subset of the plurality of input fields of the first user interface identified as having an effect on an accuracy of the rate information associated with the first insurance product offering;

in response to identifying the one or more impactful input fields, dynamically modifying a second user interface configuration schema of the plurality of user interface configuration schemata based on the one or more impactful input fields, wherein the second user interface configuration schema corresponds to a second insurance product offering, wherein a plurality of information objects of the second user interface configuration schema configure a plurality of input fields of a second user interface, and wherein modifying the second user interface configuration schema based on the one or more impactful input fields comprises at least one of:

adding the one or more impactful input fields to the plurality of input fields of the second user interface configuration schema, relocating one or more of the plurality of input fields of the second user interface configuration schema based on the one or more impactful input fields, and removing one or more of the plurality of input fields of the second user interface configuration schema corresponding to the one or more impactful input fields;

receiving a request for the second user interface configuration schema, wherein the request is received from an electronic device:

in response to receiving the request, providing the second user interface configuration schema to the electronic device, wherein providing the second user interface configuration schema to the electronic device comprises providing the plurality of information objects of the second user interface configuration schema to the electronic device to configure the plurality of input fields of the second user interface for display by the electronic device;

subsequent to providing the second user interface configuration schema, receiving information from the electronic device, wherein the received information corresponds to data entered into the plurality of input fields of the second user interface configured in accordance with the second user interface configuration schema;

determining whether the received information is valid; and in response to a determination that the received information is valid, providing rate information associated with the second insurance product offering to the electronic device.

2. The method of claim 1, wherein the plurality of information objects of each of the plurality of user interface configuration schemata include a set of required information objects and a set of optional information objects, wherein, for each of the plurality of user interface configuration schemata, the set of required information objects identify one or more information fields configured to capture information required for providing rate information for a corresponding insurance product offering, wherein, for each of the plurality of user interface configuration schemata, the set of optional information objects identify one or more information fields configured to increase an accuracy of the rate information for the corresponding insurance product offering.

3. The method of claim 2, wherein determining whether the received information is valid further comprises determining whether the received information includes a response for each of one or more information fields of the plurality of input fields of the second user interface identified by a set of required information objects of the second user interface configuration schema.

4. The method of claim 2, wherein the first user interface configuration schema corresponding to the first insurance product offering and the second user interface configuration schema corresponding to the second insurance product offering have different sets of required information objects and optional information objects.

5. The method of claim 4, wherein the different sets of required information objects for the first user interface configuration schema and the second user interface configuration schema have at least one common information field, and wherein the different sets of optional information objects for the first user interface configuration schema and the second user interface configuration schema have at least one common information field.

6. The method of claim 1, wherein the second user interface configuration schema identifies a web service associated with at least one of the plurality of input fields of the second user interface, wherein the web service provides information to the electronic device for populating the second user interface according to the second user interface configuration schema.

7. The method of claim 6, wherein the plurality of input fields of the second user interface includes at least one drop down menu, and wherein the web service identified in the second user interface configuration schema provides information for populating selectable elements of the drop down menu.

8. The method of claim 6, wherein the plurality of input fields of the second user interface includes at least one cascading input field, wherein the at least one cascading input field, when configured according to the second user interface configuration schema, provides a series of input fields, wherein information presented in the series of input fields is dynamically updated using the web service.

9. The method of claim 8, wherein dynamically updating the series of input fields includes:
  receiving input for a first input field of the series of input fields; and
  populating one or more selectable options for a second input field of the series of input fields based on the input received for the first input field.

10. The method of claim 1, wherein the second user interface configuration schema identifies a web service, and wherein the rate information associated with the second insurance product offering is provided to the electronic device via the web service.

11. The method of claim 1, wherein the method includes:
  in response to a determination that the received information is invalid, providing information that identifies at least one of the plurality of input fields of the second user interface configured to capture information that is required for providing the rate information associated with the second insurance product offering for which an input has not been received;
  subsequent to providing the information that identifies at least one of the plurality of input fields of the second user interface configured to capture information that is required for providing the rate information associated with the second insurance product offering for which an input has not been received, receiving updated information from the electronic device;
  determining whether the received updated information is valid; and
  in response to a determination that the received updated information is valid, providing the rate information associated with the second insurance product offering to the electronic device.

12. The method of claim 1, wherein the method includes:
  modifying the second user interface configuration schema in real-time to produce a modified second user interface configuration schema, wherein the second user interface configuration schema is modified in response to a change in information required to provide the rate information for the second insurance product offering; and
  in response to receiving the information from the electronic device subsequent to generating the modified second user interface configuration schema, determining whether the received information is valid based on the modified second user interface configuration schema.

13. The method of claim 12, wherein the modification of the second user interface configuration schema occurred during a time period between providing the second user interface configuration schema and generating the modified second user interface configuration schema.

14. The method of claim 1, wherein the second user interface configuration schema includes information for configuring the plurality of input fields of the second user interface to identify a plurality of insurance service providers, wherein the received information identifies one or more of the plurality of insurance service providers, and wherein the rate information associated with the second insurance product offering identifies one or more rates, each of the one or more rates corresponding to an insurance service provider of the plurality of insurance service providers identified in the received information.

15. A non-transitory computer-readable storage medium storing instructions that, when executed by a processor, cause the processor to perform operations comprising:
  periodically analyze rate information and rate request information associated with a first insurance product offering to identify one or more impactful input fields associated with a first user interface configuration schema of a plurality of user interface configuration schemata, wherein the first user interface configuration schema corresponds to the first insurance product offering, wherein each of the plurality of user interface configuration schemata identifies a plurality of information objects corresponding to a plurality of input fields configured to receive rate request information, wherein the rate request information associated with the first insurance product offering comprises information received via a plurality of input fields of a first user interface configured using the first user interface configuration schema, wherein the rate information associated with the first insurance product offering is generated based on the rate request information, and wherein the one or more impactful input fields are a subset of the plurality of input fields of the first user interface identified as having an effect on an accuracy of the rate information associated with the first insurance product offering;

in response to identifying the one or more impactful input fields, dynamically modify a second user interface configuration schema of the plurality of user interface configuration schemata based on the one or more impactful input fields, wherein the second user interface configuration schema corresponds to a second insurance product offering, wherein a plurality of information objects of the second user interface configuration schema configure a plurality of input fields of a second user interface, and wherein modifying the second user interface configuration schema based on the one or more impactful input fields comprises at least one of:

adding the one or more impactful input fields to the plurality of input fields of the second user interface configuration schema, relocating one or more of the plurality of input fields of the second user interface configuration schema based on the one or more impactful input fields, and removing one or more of the plurality of input fields of the second user interface configuration schema corresponding to the one or more impactful input fields;

receiving a request for the second user interface configuration schema, wherein the request is received from an electronic device;

in response to receiving the request, providing the second user interface configuration schema to the electronic device, wherein providing the second user interface configuration schema to the electronic device comprises providing the plurality of information objects of the second user interface configuration schema to the electronic device to configure the plurality of input fields of the second user interface for display by the electronic device:

subsequent to providing the second user interface configuration schema, receiving information from the electronic device, wherein the received information corresponds to data entered into the plurality of input fields of the second user interface configured in accordance with the second user interface configuration schema;

determining whether the received information is valid; and in response to a determination that the received information is valid, providing rate information associated with the second insurance product offering to the electronic device.

16. The non-transitory computer-readable storage medium of claim 15, wherein the plurality of information objects of each of the plurality of user interface configuration schemata include a set of required information objects and a set of optional information objects wherein, for each of the plurality of user interface configuration schemata the set of required information objects identify one or more information fields configured to capture information required for providing rate information for a corresponding insurance product offering, wherein, for each of the plurality of user interface configuration schemata, the set of optional information objects identify one or more information fields configured to increase an accuracy of the rate information for the corresponding insurance product offering, and wherein determining whether the received information is valid includes determining whether the received information includes a response for each of the one or more information fields identified by the set of required information objects of the second user interface configuration schema.

17. The non-transitory computer-readable storage medium of claim 15, wherein the operations further comprise:

periodically analyze rate information provided in association with the second insurance product offering and quote request information received in association with the second insurance product offering to identify one or more impactful input fields associated with the second user interface configuration schema and determine whether to dynamically modify the first user interface configuration schema based on the one or more impactful input fields associated with the second user interface configuration schema.

18. An apparatus comprising: one or more processors configured to:

periodically analyze rate information and rate request information associated with a first insurance product offering to identify one or more impactful input fields associated with a first user interface configuration schema of a plurality of user interface configuration schemata, wherein the first user interface configuration schema corresponds to the first insurance product offering, wherein each of the plurality of user interface configuration schemata identifies a plurality of information objects corresponding to a plurality of input fields configured to receive rate request information, wherein the rate request information associated with the first insurance product offering comprises information received via a plurality of input fields of a first user interface configured using the first user interface configuration schema, wherein the rate information associated with the first insurance product offering is generated based on the rate request information, and wherein the one or more impactful input fields are a subset of the plurality of input fields of the first user interface identified as having an effect on an accuracy of the rate information associated with the first insurance product offering;

in response to identifying the one or more impactful input fields, dynamically modify a second user interface configuration schema of the plurality of user interface configuration schemata based on the one or more impactful input fields, wherein the second user interface configuration schema corresponds to a second insurance product offering, wherein a plurality of information objects of the second user interface configuration schema configure a plurality of input fields of a second user interface, and wherein modifying the second user interface configuration schema based on the one or more impactful input fields comprises at least one of:

adding the one or more impactful input fields to the plurality of input fields of the second user interface configuration schema, wherein the one or more impactful input fields comprise at least one input field included in the first user interface configuration schema and not included in the second user interface configuration schema, relocating one or more of the plurality of input fields of the second user interface configuration schema based on the one or more impactful input fields, wherein the one or more impactful input fields comprise at least one common input field of the first user interface configuration schema and the second user interface configuration schema, and removing one or more of the plurality of input fields of the second user interface configuration schema corresponding to the one or more impactful input fields;

receive a request for the second user interface configuration schema;

in response to receiving the request, providing the second user interface configuration schema, wherein providing the second user interface configuration schema comprises providing the information objects of the second user interface configuration schema to configure the plurality of input fields of the second user interface for display;

subsequent to providing the second user interface configuration schema, receive information corresponding to data entered into the plurality of input fields of the second user interface configured in accordance with the second user interface configuration schema;

determine whether the received information is valid; and in response to a determination that the received information is valid, provide rate information associated with the second insurance product offering; and a memory coupled to the one or more processors.

19. The method of claim 2, wherein the one or more impactful input fields associated with the first user interface configuration schema comprises at least one input field included in the plurality of input fields of the first user interface corresponding to the first user interface configuration schema and not included in the plurality of input fields of the second user interface corresponding to the second user interface configuration schema, and wherein adding the one or more impactful input fields to the plurality of input fields of the second user interface configuration schema includes:

automatically modifying the second user interface configuration schema to include information objects associated with the at least one input field of the first user interface configuration schema, and monitoring whether inclusion of the information objects associated with the at least one input field into the second user interface configuration schema has an effect on an accuracy of the rate information for the second insurance product offering.

20. The method of claim 5, wherein the one or more impactful input fields associated with the first user interface configuration schema comprises at least one common input field included in the plurality of input fields of the first user interface corresponding to the first user interface configuration schema and included in the plurality of input fields of the second user interface corresponding to the second user interface configuration schema, wherein the at least one common input field corresponds to the at least one common information field of the first user interface configuration schema and the second user interface configuration schema, and wherein relocating one or more of the plurality of input fields of the second user interface configuration schema based on the one or more impactful input fields includes:

automatically relocating the at least one common input field within the second user interface configuration schema from a first location to a second location, wherein the first location corresponds to an initial location of the at least one common input field within the second user interface configuration schema, wherein the second location corresponds to a subsequent location of the at least one common input field within the second user interface configuration schema, and wherein the second location of the at least one common input field within the second user interface configuration schema corresponds to a location of the at least one common input field within the first user interface configuration schema, and monitoring whether relocation of the at least one common input field within the second user interface configuration schema to the second location has an effect on an accuracy of the rate information for the second insurance product offering.

* * * * *